United States Patent [19]

McCormick

[11] 4,248,440
[45] Feb. 3, 1981

[54] TITANIA-ALUMINA-YTTRIA PISTON RING FACING

[75] Inventor: Harold E. McCormick, Ballwin, Mo.

[73] Assignee: Ramsey Corporation, Manchester, Mo.

[21] Appl. No.: 74,735

[22] Filed: Sep. 12, 1979

[51] Int. Cl.³ .................. C04B 35/44; C04B 35/46; F16J 9/22
[52] U.S. Cl. .................. 277/224; 106/73.2; 106/73.33; 106/73.4; 277/235 A; 427/34; 427/423; 428/472
[58] Field of Search .................. 106/73.2, 73.33; 427/34, 423; 277/244, 235 A; 428/472, 564

[56] References Cited

U.S. PATENT DOCUMENTS

| 3,697,091 | 10/1972 | Prasse et al. | 277/235 A |
|---|---|---|---|
| 3,822,338 | 7/1974 | Merker | 423/598 X |
| 4,106,782 | 8/1978 | Hyde et al. | 277/235 A |
| 4,118,240 | 10/1978 | Takabatake | 106/73.33 |
| 4,180,622 | 12/1979 | Burkhard et al. | 428/564 |
| 4,181,532 | 1/1980 | Woodhead | 106/73.2 X |
| 4,194,917 | 3/1980 | Sakemi et al. | 106/73.33 X |

OTHER PUBLICATIONS

Wilms, V. et al., "Plasma Spraying of $Al_2O_3$ and $Al_2O_3$-$Y_2O_3$" Thin Solid Films-39-(1976), pp. 251-262.

Primary Examiner—Helen M. McCarthy

[57] ABSTRACT

Disclosed is a coating for bearing faces of piston rings and a powder composition for plasma spray application of such coating. The plasma spray powder comprises 94%-98% by weight of aluminum oxide and titanium oxide and 2%-6% by weight of yttrium oxide. The inclusion of yttrium oxide in the aluminum oxide-titanium oxide coating composition reduces the tendency of the coating to blistering and spalling which resulting in coating loss during use of the ring. Intracoating delamination is substantially reduced or eliminated.

7 Claims, 5 Drawing Figures

U.S. Patent  Feb. 3, 1981  4,248,440
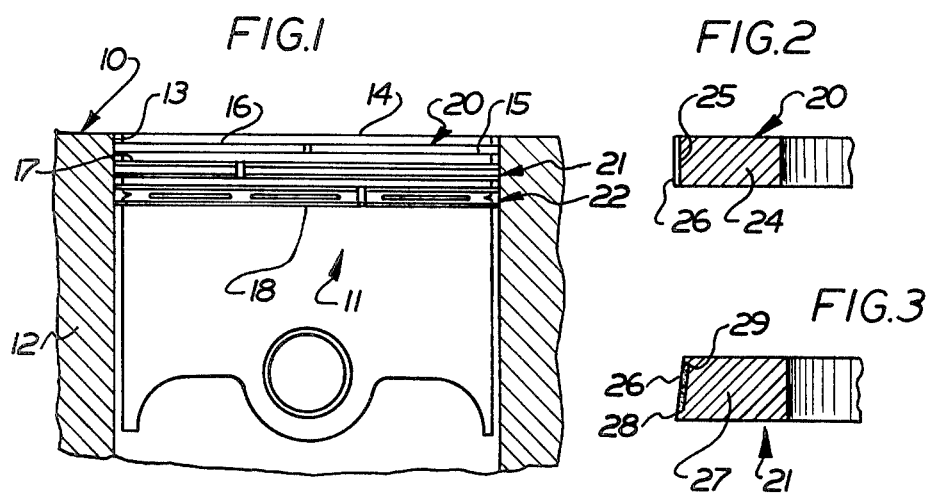
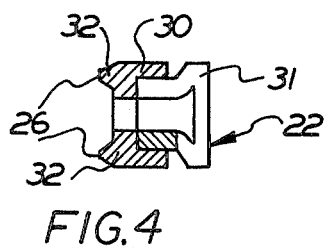
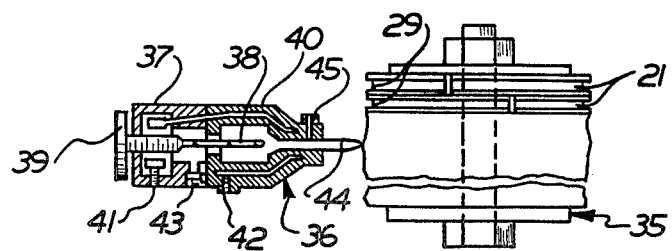

TITANIA-ALUMINA-YTTRIA PISTON RING FACING

BACKGROUND OF THE INVENTION

This invention relates to coatings for the bearing surfaces of piston rings, particularly piston rings used in an internal combustion engine. The coatings are produced by plasma spray application of a powder to the bearing face of the piston ring, which powder is composed of oxides of titanium, aluminum and yttrium.

Plasma applied coatings of alumina and titania for the bearing faces of compression and oil control piston rings of internal combustion engines are known. Thus, U.S. Pat. No. 3,697,091, describes a bearing face coating which consists essentially of about 75-90% aluminum oxide and 10-25% by weight titanium oxide. A piston ring coating of alumina and titania along with ferric oxide is disclosed in U.S. Pat. No. 4,077,637. In U.S. Pat. No. 4,115,959, an alumina-titania coating is described which further includes about 10-15% of an alkaline earth metal fluoride which reduces the wear on grinding wheels used to grind and finish the coated piston rings. The inclusion of the alkaline earth metal fluoride has been found to reduce the number of dressing operations required to be performed on the grinding wheels during the finish grinding process.

These refractory metal oxide coatings are superior to various metal and metal alloy coatings, such as molybdenum alloy coatings, in a number of respects. Specifically, the metal oxide coating compositions have been found to have improved scuff resistance and outstanding thermal shock resistance when compared to molybdenum alloy coatings.

Rings coated with alumina-titania plasma applied coatings have exhibited a tendency to flake or blister during engine operation. It is believed that at elevated temperatures such as found in a diesel engine, the metal oxide coating materials undergo a phase transformation. This phase transformation is believed to cause loss of intra-coating cohesion resulting in undesirable delamination by blistering and spalling of portions of the coating. The delamination is due to lack of cohesion within the coating itself. Blisters of about 1/16" diameter and 0.0001" thickness appear in the surface of the coating which is generally 0.004" thick. The blister material is then scuffed off and a loss of coating results. Another theory is that Hertzian stress caused by contact in the cylinder will cause cracks to develop within the coating layers resulting in flaking delamination.

It is known in the art that yttrium (as the element) aids in the bonding of naturally formed oxide coatings to the surface of metal superalloys. In a paper presented in the International Conference on Metallurgical Coatings in San Francisco in April, 1976, entitled "Plasma Spraying of $Al_2O_3$ and $Al_2O_3$-$Y_2O_3$" ("Thin Solid Films"39 (1976) pp. (251-262), it was reported that yttrium oxide has similar beneficial effects on bonding adhesion of sprayed oxide coatings, specifically aluminum oxide coatings, over a steel substrate.

SUMMARY OF THE INVENTION

It has now been found that intra-coating delamination can be reduced or eliminated in alumina-titania piston ring coatings and improved bore wear attained by including about 2%-6% yttria (yttrium oxide, $Y_2O_3$) in the plasma spray powder composition used to produce the coatings.

In accordance with the invention, a refractory metal oxide coating for the bearing surfaces of piston rings and a plasma spray powder composition therefor comprises a mixture of alumina and titania which further includes from about 2% to about 6% by weight of yttrium oxide, $Y_2O_3$.

Further in accordance with the invention, a plasma spray powder composition for applicaton to the bearing faces of piston rings comprises a mixture of about 60%-90% by weight aluminum oxide ($Al_2O_3$), 8%-35% by weight titanium dioxide ($TiO_2$) and about 2%-6% by weight of yttrium oxide. This powder is then applied to the bearing surface of the piston ring by known plasma spray techniques and the surface is ground to the final finish as is known in the art.

It is therefore an object of the invention to provide a powder composition for a piston ring bearing face coating which retains the scuff resistant and thermal shock resistant properties of titania-alumina plasma spray coatings while resisting any tendency to blister and/or spall within the coating during high temperature operation and improve bore wear characteristics.

It is another object of this invention to provide a plasma spray powder coating material which when applied to the bearing faces of piston rings is scuff and thermal shock resistant and is resistant to blistering and spalling during high temperature operation, and wherein the coating material consists essentially of a mixture of alumina, titania, and in accordance with a feature of this invention, 2 to 6% yttria.

BRIEF DESCRIPTION OF THE DRAWINGS

These and other objects and features of the present invention will become more apparent upon a consideration of the following description taken in connection with the accompanying drawings forming a part of this specification and in which:

FIG. 1 is a side elevational view, with parts in cross section, of an engine piston ring cylinder assembly wherein the piston has ring grooves equipped with compression and oil control rings, each having a bearing face engaging the cylinder wall, which bearing face is composed of an in situ formed plasma jet applied refractory metal oxide coating according to this invention;

FIG. 2 is an enlarged fragmentary cross sectional view of the top compression ring shown in FIG. 1;

FIG. 3 is a view similar to FIG. 2 but illustrating the second compression ring in piston of FIG. 1;

FIG. 4 is a view similar to FIG. 2, but illustrating the oil control ring in the third ring groove of the piston of FIG. 1; and FIG. 5 is a diagramatic cross sectional view of a plasma flame spray gun typically used to coat a cast iron base material according to the present invention.

DETAILED DESCRIPTION OF PREFERRED EMBODIMENTS AND THE DRAWINGS

Referring now more specifically to FIG. 1, the piston and cylinder assembly 10 of FIG. 1 includes generally a conventional 3-ring groove internal combustion engine piston operating in an engine cylinder. The assembly 10 includes a piston 11 and an engine cylinder 12 with a bore 13 receiving the piston 11. The piston 11 has a head 14 with the ring band 15 having three peripheral ring grooves 16, 17 and 18 therearound. The top ring groove 16 has a split, solid cast iron compression or fire piston ring 20 therein. The second ring groove 17 has a split, solid second compression ring 21 somewhat wider than the ring 20. The third ring groove 18 carries a two-piece oil control ring assembly 22.

As shown in FIG. 2, the top compression or fire ring 20 has a main body 24 composed of cast iron, preferably nodular gray iron, with a carbon content of about 3.5% by weight. The outer periphery 25 of this ring 20 is covered with a plasma jet applied refractory metal oxide coating 26 of the present invention.

As is shown in FIG. 3, the second compression ring 21 has a main body 27 composed of the same type of cast iron as the body 24 of the ring 20. The outer periphery 28 of the body 27 is inclined upwardly and inwardly from the bottom edge of the ring and a peripheral groove 29 is formed around this inclined periphery 28. The groove 29 is filled with the refractory metal oxide coating 26 of the present invention.

As shown in FIG. 4, the oil control ring assembly 22 in the third ring groove 18 is composed of a one-piece, flexible channel ring 30 and a sheet metal expander ring 31, having legs extending into the channel for expanding the ring 30. The ring and expander are more fully described in U.S. Pat. No. 3,281,156.

The one-piece oil control ring 30 has a pair of axially spaced, radially projecting beads 32. The peripheries of these beads 32 are coated the refractory metal oxide coating 26 of the present invention.

From the above description, it will be understood that the bearing faces of each of the compression and oil control rings 20, 21 and 22 are coated with a coating 26 in accordance with the present invention. The thus coated bearing faces ride on and sealingly engage the wall of the bore 13 of the engine cylinder 12. The piston rings 20, 21 and 22 are compressed in the bore 13 so as to expand tightly against the bore wall and maintain a good sealing, sliding engagement therewith.

As shown in FIG. 6, the coating or face 26 is applied on the rings as for example, on the grooved rings 21, by stacking a plurality of the rings on an arbor 35 with the rings compressed so that their split ends will be nearly in abutment. The arbor clamping the stack of rings in their closed, contracted position, may be mounted in a lathe and the peripheries of the ring machined to form the grooves 29 therearound. The outer peripheries of the rings 21 on the arbor are then coated with an oxide matrix 26 from a plasma jet spray gun 36.

The gun 36 includes an insulated casing 37 fabricated of a material such as nylon, from which projects a rear electrode 38, the projection of which is adjustably controlled by a screw knob 39. The front face of the casing receives a front electrode 40. The casing 37 and the electrode 40 are hollow and water jacketed so that the coolant may be circulated therethrough from an inlet 41 to an outlet 42. Plasma jet gas of conventional composition is fed through an inlet 43 into the chamber provided by the casing 37 and the electrode 40 to flow around the electrode 38. The front end of the electrode 40 provides a nozzle outlet 44 for the plasma flame and the ingredients to form the oxide coating 26 are fed to this nozzle through a powder inlet 45, just in advance of the discharge outlet of the nozzle.

A plasma flame composed of ionized gas is produced by passing the plasma gas from the inlet 43 through an electric arc established between electrodes 38 and 40. The plasma gas is nonoxidizing and is composed of nitrogen or argon in combination with hydrogen. The plasma flame exiting from the nozzle 44 draws the coating-forming powder therewith by aspiration and subjects the powder ingredients to such high temperatures as to cause them to fuse together. The spray powder is usually suspended in a carrier gas. The jet stream carries the material into the bottom of groove 29 of each piston ring to fill the groove.

Reference may be had to the aforementioned U.S. Pat. No. 3,697,091, for the details of coating compositions of titanium dioxide and aluminum oxide, and the spray parameters by which the oxide coatings of the present invention, including the yttrium oxide, may be sprayed onto an arbor 35 containing piston ring blanks by the plasma spray technique. The plasma application of the refractory metal oxides are the same in the present method as they are for the application of the refractory metal oxides without the added yttrium oxide component.

A typical set of spray parameters useful in applying ceramic oxide coatings to piston compression rings is as follows:

| | |
|---|---|
| Number of guns | 1 |
| Type of plasma spray gun | Metco 3NB |
| Gun to work distance | 4.5 inches |
| Angle of gun to axis of work | 45° |
| Amperage, D.C. | 500 |
| Voltage | 85 reference |
| Secondary gas - hydrogen | 15 std. cubic ft/hour (SCFH) |
| Primary gas - nitrogen | 75 (SCFH) |
| Carrier gas - nitrogen | 37 (SCFH) |
| Rate of vertical feed | 24–32 inches/minute |
| Speed of arbor rotation | 65–90 rpm based on a 4-inch diameter arbor |
| Powder feed rate | 6–8 pounds per hour |

Inasmuch as excessive temperatures will damage piston rings, during spraying, the temperature of the rings on the arbor is maintained below 700° F. and preferably below 400° F.

In accordance with the present invention, the powder composition to be applied by the above-described plasma spray technique generally comprises about 60%–90% alumina, 8%–35% titania and 2%–6% yttria. It has been determined that the 2%–6% yttria improves the resistance of the piston ring coating to delamination within the coating, that is, an intracoating splitting apart due to a loss of cohesion within the coating. When substantially less than 2% yttria is used, delamination tends to occur within the coating with a resulting spalling and blistering which reduces piston ring life. When substantially more than 6% yttria is used, the hardness of the piston ring coating is reduced with a resulting increase in the rate of piston ring wear.

It appears that the function of the yttria within the coating is that of a "glue" as a means for increasing the cohesion of coating components to each other. This is true whether the coating exists as a compound, $Al_2TiO_5$ or as separate $Al_2O_3$ and $TiO_2$ components. Too little yttria has little or no effect on the basic alumina-titania coating while too much causes an undesirable loss of coating hardness.

The following examples will serve to illustrate a preferred embodiment of the invention. Such examples should be considered only for the purposes of illustration and not limitation, it being understood that other formulations within the stated ranges are possible. The coatings may be applied by the plasma spray technique using the foregoing spray parameters.

EXAMPLE 1

A powder composition containing 83% alumina ($Al_2O_3$), 14% titania ($TiO_2$), and 3% yttria ($Y_2O_3$) by weight and a particle size in the range of from −270 U.S. Standard mesh to +10 microns was applied to a number of standard cast iron piston rings mounted on an arbor as shown in FIG. 6 until the rings were covered with the aluminum oxide-titanium oxide-yttrium oxide coating.

Following cooling to room temperature, the coating was ground in a known manner to a thickness of about 0.004 inches. Only one dressing operation on the grinding wheel operating surface was necessary during the grinding operation. This compares to as many as 5–7 wheel dressing operations necessary in grinding similar rings having a coating of only alumina and titania without the inclusion of yttria in the coating.

EXAMPLE 2

Rings coated with the alumina-titania-yttria coating in accordance with Example 1 and rings coated with 87% alumina and 13% titania (no yttria) were subjected to engine tests in order to compare operating characteristics.

Specifically, both end clearance change and bore wear data were obtained for both compositions. With respect to the end clearance change, the following procedure was carried out. The rings were first confined in a precise diameter gauge. In order to avoid a change in the end clearance (E.C.) due to small changes in gauge diameter, the same gauge was used before and after the test. The end clearance between the two gap ends of the split piston rings were then measured using a toolmaker's microscope with a calibrated lens system. Thereafter, the rings were installed in an engine which was operated in a specific test schedule for a prescribed length of time. After the test was completed, the rings were removed from the engine, any carbon accumulation carefully removed, and the above measurements repeated. The change in piston ring end clearance is a measurement of the wear.

With respect to the bore wear test, the radius of each bore was measured before the test in the area of the top compression ring travel. Measurements were taken of the cylinder along two intersecting radii. This procedure was then repeated after the test and the difference was calculated as the bore wear. Five micron abrasives were injected into the combustion chamber to accelerate wear.

After 150 hours of engine operation, the end clearance on the ring having the alumina-titania-yttria coating thereon was worn approximately 0.001 inch. This compared to an end clearance increase of approximately 0.003 inch with the ring having the alumina-titania (no yttria) coating thereon.

After the 150 hours of engine operation, radial bore wear for the cylinder utilizing piston rings with the yttria modified alumina-titania coating was approximately 0.001 inch. This compares with a radial bore wear of 0.004 inch for the unmodified alumina-titania piston ring.

EXAMPLE 3

The alumina-titania-yttria piston ring of Example 1 was subjected to 900 cycles of thermal shock testing. The test involves the heating to engine operating temperatures followed by a water quenching. This process is repeated for the requisite number of cycles. A similar piston ring having a coating containing 87% alumina and 13% titania (no yttria) was similarly subjected to the same 900 cycle thermal shock test for purposes of comparison. Following the testing, the alumina-titania-yttria coated piston ring had a weight loss of 0.05 gram. No delamination blistering or spalling due to loss of cohesion within the coating was indicated. The alumina-titania coated piston ring had a weight loss of 0.85 gram with considerable evidence of blistering and spalling delamination due to a loss of cohesion within the coating.

EXAMPLE 4

A powder composition having a particle size from −325 U.S. Standard mesh to +5 micron and containing 60% alumina, 35% titania and 4% yttria by weight, the balance being other metal oxides and/or organic binders, was applied to the bearing surfaces of piston rings mounted in an arbor as shown in FIG. 6 utilizing the aforementioned plasma spray parameters. The rings were then cooled to room temperature and ground and finished in a manner known in the art.

EXAMPLE 5

The piston rings coated as in Example 4 were subjected to engine testing. Piston rings having a coating as described in Example 4 were compared for ring and bore wear against a piston ring having a coating of 60% alumina and 40% titania by weight. Following testing in a four cycle diesel engine, the radial bore wear rate for the two piston rings was determined and was found to be 0.00003" per 100 hours engine operation with the alumina-titania-yttria coated piston ring while the alumina-titania coated ring had a bore wear rate of 0.00005" per 100 hours. The ring wear rate for the alumina-titania-yttria coated ring ranged from 0.0016 to 0.002" per 100 hours operation while the alumina-titania coated ring exhibited a wear rate of 0.0007 to 0.0014" per 100 hours.

EXAMPLE 6

The piston rings of Example 5 were subjected to the 900 cycle thermal shock testing as described in Example 3. Although specific weight loss was not calculated, the alumina-titania coated piston ring exhibited considerable blistering and spalling delamination due to loss of cohesion within the coating while no such delamination was found on the alumina-titania-yttria coated ring.

In some instances, it may be preferred to first apply a bond coat to increase the adhesion between the outer coating alumina-titania-yttria and the base cast iron material. Preferred bond coats include both molybdenum and nickle-aluminide. A typical underlying coating of nickel and aluminum includes 80%–95% by weight of nickel, with the remainder being alumina. However, in any event, the intracoating cohesive properties of the alumina-titania-yttria coating are found to be the same whether it is applied over a bond coating or directly to the cast iron base.

The named ingredients and percentage in the foregoing examples are not intended to denote purity. For example, the metal oxides used are of commercial purity only and may contain normal amounts of pure metal, other metal oxides, organics and the like. Clearly, pure refractory metal oxides may be used, if desired and available.

From the foregoing, it can be clearly seen that the incorporation of 2%–6% yttrium oxide, $Y_2O_3$, offers substantial improvement in the grinding and wear characteristics of piston ring bearing face coatings having 94%–98% by weight of a mixture of alumina and titania. The rings of the invention are preferably coated utilizing a plasma jet spray technique wherein the coatings are formed in situ on the ring. The coating containing 2%–6% yttria offers substantial advantages over prior art piston ring bearing face coatings.

It has been shown that intra-coating delamination can be reduced or eliminated in alumina-titania piston ring coatings by including about 2%–6% yttria in the plasma spray powder composition used to produce the coatings.

A refractory metal oxide coating for the bearing surfaces of piston rings and a plasma spray powder composition therefor comprises 94% to 98% of mixture of alumina and titania which further includes from about 2% to about 6% by weight of yttrium oxide, $Y_2O_3$.

A plasma spray powder composition for application to the bearing faces of piston rings comprises a mixture of about 60%–90% by weight aluminum oxide ($Al_2O_3$), 8%–35% by weight titanium dioxide ($TiO_2$) and about 2%–6% by weight of yttrium oxide. This powder can then be applied to the bearing surface of the piston ring by known plasma spray techniques and the surface is ground to the final finish as is known in the art.

The invention provides a powder composition for a piston ring bearing face coating which retains the scuff resistant and thermal shock resistant properties of titania-alumina plasma spray coatings while resisting any tendency to blister and/or spall within the coating during high temperature operation. Further, bore wear is reduced with coatings including yttria compound in comparison to alumina-titania coatings with no yttria.

The invention also provides a plasma spray powder coating material which when applied to the bearing faces of piston rings is scuff and thermal shock resistant and is resistant to blistering and spalling during high temperature operation, and wherein the coating material consists essentially of 94% to 98% by weight of a mixture of alumina and titania, and in accordance with a feature of this invention, 2% to 6% yttria.

What is claimed is:

1. A powder composition for application to a bearing surface by plasma spray technique, said composition consisting about 60%–90% by weight of alumina, about 8%–35% titania and about 2%–6% yttria.

2. The powder composition as described in claim 1 consisting of 83% alumina, 14% titania, and 3% yttria.

3. The powder composition as described in claim 2 wherein said powder has a particle size in the range of −270 mesh to +10 microns.

4. The powder composition as described in claim 1 in which alumina is 60% and titania is 35%.

5. The powder composition as described in claim 4 wherein the powder has a particle size of −325 mesh to +5 microns.

6. A piston ring having a bearing face coating applied thereto by a plasma spray technique, the plasma sprayed powder of refractory metal oxide consisting of from 60%–90% alumina by weight of said coating, from 8%–35% titania and from 2%–6% yttria, the resultant coating being resistant to spalling and blistering delamination within the coating.

7. The piston ring as described in claim 6 wherein said yttria is present in an amount of 3%, said alumina is present in an amount of 83% and said titania is present in an amount of 14% by weight.

* * * * *